United States Patent

Thompson

[15] 3,644,255

[45] Feb. 22, 1972

[54] STABLE DISPERSIONS

[72] Inventor: Darrell R. Thompson, Charlotte, N.C.

[73] Assignee: E. I. du Pont de Nemours and Company, Wilmington, Del.

[22] Filed: Dec. 9, 1969

[21] Appl. No.: 883,648

Related U.S. Application Data

[63] Continuation-in-part of Ser. No. 776,774, Nov. 18, 1968.

[52] U.S. Cl...................260/29.1 R, 260/30.4 R, 260/31.2 R, 260/32.8 R, 260/33.4 R, 260/33.4 F, 260/33.6 R, 260/33.6 F, 260/34.2

[51] Int. Cl...................B01f 17/54, C08f 45/26, C08f 45/32

[58] Field of Search............260/34.2, 33.6 F, 33.4 F, 30.4 R, 260/33.4 R, 33.6 R, 32.8 R, 29.1 R, 31.2 R

[56] References Cited

UNITED STATES PATENTS 3,232,903 2/1966 Schmidle et al. ......................260/33.6
3,317,635 5/1967 Osmond...............................260/34.2
3,383,352 5/1968 Ovell et al.............................260/34.2
3,393,162 9/1968 Cox et al...............................260/34.2
3,405,087 10/1968 Fryd ....................................260/33.6
3,505,268 9/1970 Backhouse et al....................260/34.2
3,408,420 10/1968 Wiggill..................................260/827

*Primary Examiner*—Allan Lieberman
*Attorney*—Fred F. Butzi

[57] ABSTRACT

A dispersion of particles in an organic liquid containing, as an antiflocculating agent, molecules of a polymeric material represented by the structure

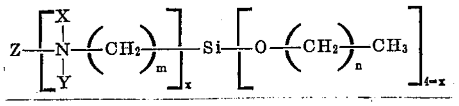

where Z can be a polymeric segment bearing functional groups capable of bonding to the nitrogen atom, and X and Y can be any substituent which does not interfere with bonding Z to the nitrogen atom.

37 Claims, No Drawings

STABLE DISPERSIONS

CROSS-REFERENCE TO RELATED APPLICATIONS

This application is a continuation-in-part of copending application Ser. No. 776,774, filed Nov. 18, 1968.

STATEMENT OF THE INVENTION

This invention is directed to dispersions. It is more particularly directed to dispersions comprising A. an organic liquid, B. particles dispersed in the liquid, and C. as an antiflocculating agent, from 0.001 to 10 percent (by weight of the solids) of molecules of a polymeric material represented by the structure $$(1)\quad Z \longrightarrow \left[ \underset{\substack{| \\ Y}}{\overset{\substack{X \\ |}}{N}} - \left( CH_2 \right)_m \right]_x - Si - \left[ O - \left( CH_2 \right)_n - CH_3 \right]_{4-x}$$

where

Z can be a polymeric segment bearing functional groups capable of bonding to the nitrogen atom;

X and Y can be hydrogen, HO $(CH_2)_p$, $NH_2(CH_2)_q$, $NH_2(CH_2)_q NH(CH_2)_r$, $NH_2(CH_2)_q NH(CH_2)_r$, (where $p$, $q$ and $r$ are 1–10), alkyl of one through 10 carbon atoms or cycloalkyl of four through six carbon atoms (X and Y need not be the same);

$m$ is 1–10;

$n$ is 0–10; and $x$ is 1–3.

In formula (1), the symbol Z⟶ is used to denote that the polymeric segment represented by Z is bonded to the nitrogen atom. This bond can be a covalent, ionic, coordinate or hydrogen bond.

In a broader sense, X or Y in formula (1) can be any substituent that does not interfere with linking Z to the nitrogen atom.

Also more broadly, the silane moiety of the molecule can be derived from an epoxy silane or a vinyl silane such as $\beta$-(3,4-epoxycyclohexyl)ethyltrimethoxy silane, $\gamma$-glycidoxypropyl trimethoxy silane and vinyl-tris(2-methoxyethoxy) silane. When these silanes are used, the polymeric segment Z must be capable of bonding directly to the silane.

The polymeric materials of formula (1) may also exist in a form wherein several silane moieties are attached to a single Z portion.

UTILITY

The dispersions of the invention are highly resistant to flocculation. This makes them especially useful in preparing coating compositions.

For example, stable organosols of organic polymers such as polyvinyl fluoride, polyvinylidine fluoride, polyvinyl chloride, polyvinylidine chloride and polymers of acrylic and methacrylic acids and their amides, nitriles and esters with alkanols of one through 18 carbon atoms, prepared according to the invention, can be used to prepare coating compositions in which these polymers are the film-forming components. The polymers will ordinarily be present in the dispersions at concentrations of from 5 to 50 percent (by weight).

The particles in the dispersions of the invention can also be pigment particles. Illustrative of the pigments which can be used are titanium dioxide, carbon black, zinc oxide, lead titanate, potassium titanate, antimony oxide, lithopone, pthalocyanine blue, toluidine red, quinacridone and the like.

The pigment dispersions of the invention are resistant to flocculation, which gives the paints into which they are incorporated higher initial gloss, better hiding and tinting strength and makes them resistant to color drift and gloss loss.

The polyvinyl fluoride dispersions are especially suited for preparing coating compositions because, first of all, their use significantly reduces the veining and ridging that occurs when conventional polyvinyl fluoride compositions are applied by roller-coating, as they are in coil-coating operations, and secondly, they show reduced color change on extended storage, as do the finishes derived from them.

Polyvinyl fluoride dispersions especially suited for preparing coating compositions contain a polymeric material of formula (1) wherein Z is a segment of a vinyl addition copolymer which contains from about 0.1 through about 20 percent, by weight, preferably 1–10 percent, of acid units. The selection of the vinyl addition polymer in any given instance will depend on the nature of the rest of the molecule and of the dispersed polymer, on the organic liquid used, on the use to be made of the dispersion and like factors. This selection can be made with no difficulty by a polymer chemist, using well-known principles of polymer chemistry.

Even more preferred are polyvinyl fluoride dispersions wherein the acid units of the polymeric material of formula (1) are carboxyl-bearing. Of these dispersions, those in which the carboxyl groups of the polymeric material are supplied by itaconic acid give especially good results.

Polyvinyl fluoride dispersions in which the polymeric materials of formula (1) have Z portions with number average molecular weights of from about 1,000 to about 500,000 are also preferred.

Polyvinyl fluoride dispersions especially suited for preparing coating compositions are those wherein Z of the polymeric material of formula (1) is a methyl methacrylate/butyl acrylate/itaconic acid terpolymer, especially a 30–60/40–70/0.1–30 terpolymer and even more preferably the 50/40/10 terpolymer (where the numbers denote the corresponding monomer unit weight ratios).

Also especially suited for this use are polyvinyl fluoride dispersions containing the polymeric materials of formula (1) wherein Z is a methyl methacrylate/itaconic acid copolymer. The 90–99.9/0.1–10 copolymers give good results and the 96–98/2–4 copolymers are even more preferred.

When used in systems containing water, the polymeric materials of formula (1) may hydrolyze and the structure shown in formula (1) may vary accordingly.

Those polyvinyl fluoride dispersions of the invention most preferred for preparing coating compositions are those containing the dispersing agents represented by the formulas $$(1)\quad Z \longrightarrow \begin{matrix} HOCH_2CH \\ HOCH_2CH_2 \end{matrix} \!\!> N - \left( CH_2 \right)_3 - Si - \left( OCHCH_3 \right)_3$$

$$(2)\quad Z \longrightarrow H_2NCH_2CH_2 - \overset{H}{N} - \left( CH_2 \right)_3 - Si - \left( OCH_3 \right)_3$$

$$(3)\quad Z \rightarrow NH_2(CH_2)_3 - Si\ (OCH_2CH_3)_3$$

and $$(4)\quad Z \rightarrow NH_2(CH_2)_2NH(CH_2)_2 - NH\ (CH_2)_3 - Si\ (OCH_3)_3$$

wherein Z in each is a methyl methacrylate/butyl acrylate/itaconic acid 30–60/40–70/0.1–30 terpolymer or a methyl methacrylate/itaconic acid 90–99.9/0.1–10 copolymer.

PREPARATION AND USE

The dispersions of the invention are made by first placing from 5 parts to about 60 parts, preferably 10 to 30 parts, of a finely divided pigment or a polymer such as polyvinyl fluoride in from 40 to 95 parts of a suitable organic liquid such as butyrolactone, propylene carbonate, isophorone, a ketone, an aromatic or aliphatic hydrocarbon, an ester, an alcohol or a mixture of these. Butyrolactone/isobutyl alcohol 90/10 (weight ratio) and propylene carbonate/isobutyl alcohol 90/10 are preferred.

The polymer particles and the liquid are then mixed for about thirty minutes and from 0.001 to about 10 percent (by weight of the solids), preferably 0.1 to 0.5 percent of an appropriate aminosilane such as $$(HO{-}CH_2CH_2)_2N(CH_2)_3Si(OCH_2CH_3)_3 \quad 1.$$
$$NH_2(CH_2)_2NH(CH_2)_3Si(OCH_3)_3 \quad 2.$$
$$NH_2(CH_2)_3Si(OCH_2CH_3)_3 \quad 3.$$
$$NH_2(CH_2)_2NH(CH_2)_2NH(CH_2)_3Si(OCH_3)_3 \quad 4.$$

is added to the dispersion, which is then mixed for another 30 minutes.

From 0.1 to 10 times the weight of silane of water is then added to the dispersion, which is again mixed for 30 minutes, whereupon from 1 to 40 percent (by weight of the solids in the dispersion), preferably 15 to 25 percent, of the polymer which is to provide the Z portion of the polymeric material of formula (1) is added and the dispersion again mixed for 30 minutes.

To the resulting dispersion can be added pigments and such other adjuncts as appear necessary or desirable, and the mixture sand ground, to give a coating composition which can be applied and cured in the customary ways.

DESCRIPTION OF THE PREFERRED EMBODIMENTS

The following examples are submitted so that those skilled in the art will be able to practice the invention more easily. Those artisans will, no doubt, be able to compose numerous variations on the disclosed themes. These variations are naturally considered part of the inventive concept.

In the examples all parts are by weight.

EXAMPLE 1

538 Parts of butyrolactone were charged to a pebble mill. To this were then added, with mixing, 222 parts of polyvinyl fluoride powder.

One-half part of N-bis(beta-hydroxyethyl) gamma-aminopropyltriethoxy silane was then added to the mixture and the resulting dispersion mixed for 30 minutes. One part of water was then added and the dispersion again mixed for 30 minutes.

To the dispersion were then added 80.5 parts of a methyl methacrylate/butyl acrylate/itaconic acid 50/40/10 terpolymer. The dispersion was mixed for 30 minutes, after which 167 parts of titanium dioxide, 2.4 parts of dibutyl tin mercaptide and 50 parts of isobutyl alcohol were added. This dispersion was mixed for 10 minutes, pebbles were added and the dispersion ground for 24 hours.

The resulting enamel showed no veining or ridging when applied to aluminum strips in a coil-coating operation.

Other polyvinyl fluoride coating compositions can be formulated in a similar manner by substituting equivalent weights of any of the polymeric materials in the following list for that used above:

$$Z \rightarrow H_2NCH_2CH_2NH\,(CH_2)_3{-}Si\,(OCH_3)_3$$
$$Z \rightarrow NH_2(CH_2)_3{-}Si\,(OCH_2CH_3)_3$$
$$Z \longrightarrow NH_2(CH_2)_2NH(CH_2)_2NH(CH_2)_3bh{-}Si\,(OCH_3)_3$$

where Z in each is a methyl methacrylate/butyl acrylate/itaconic acid 30–60/40–70/0.1–30 terpolymer or a methyl methacrylate/itaconic acid 90–99.9/0.1–20 copolymer.

EXAMPLE 2

Monastral Blue W-550* (200 parts), benzene (600 parts), N-beta-aminoethyl gamma-aminopropyl trimethoxy silane (4 parts), were milled for 24 hours. The benzene was then removed by air drying the mixture.

A mill base was prepared with this pigment by grinding 40.5 parts of it, in the conventional way, with 184.5 parts of xylene and 225 parts of a 50 percent solution of a styrene/acrylic acid/Cardura E* 61/11/28 terpolymer in a 4/4/2 blend of xylene, aromatic hydrocarbon and butyl alcohol.

*E. I. du Pont de Nemours and Co.

*A glycidyl ester of the formula $\overset{O}{\overbrace{CH_2{-}CH}}{-}CH_2{-}O{-}\overset{O}{\overset{\|}{C}}{-}R$ where R is a tertiary aliphatic hydrocarbon group. Sold by Shell Chemical Co.

A mill base was made of this pigment, using customary techniques. This mill base was, in turn, used to prepare a conventional compatible coating composition. This coating composition was remarkably resistant to flocculation.

I claim:

1. A dispersion comprising
A. an organic liquid carrier;
B. polymer or pigment particles dispersed in the liquid; and
C. as an antiflocculating agent, from 0.001 to 10 percent of molecules of a polymeric material represented by the structure $$Z \longrightarrow \left[\underset{Y}{\overset{X}{N}}{-}(CH_2)_m\right]_x Si\left[O{-}(CH_2)_n{-}CH_3\right]_{4-x}$$

wherein
Z is a vinyl addition polymer segment containing from about 0.1 through about 20 percent, by weight, of acid units and bearing functional groups capable of bonding to the nitrogen atom;
X and Y can be hydrogen, HO $(CH_2)_p$, $NH_2\,(CH_2)_q$, $NH_2\,(CH_2)_qNH\,(CH_2)_r$ (where *p*, *q* and *r* are 1–10), alkyl of one through 10 carbon atoms or cycloalkyl of four through six carbon atoms (X and Y need not be the same);
*m* is 1—10;
*n* is 0—10;
and
*x* is 1—3.

2. The dispersion of claim 1 wherein the dispersed particles in (B) are polymer particles.

3. The dispersion of claim 2 wherein the acid units are carboxyl-bearing.

4. The dispersion of claim 3 wherein the polymeric material has a Z segment whose molecular weight is 1,000–500,000.

5. The dispersion of claim 3 wherein the acid units are of itaconic acid.

6. The dispersion of claim 5 wherein Z of the polymeric material is a methyl methacrylate/butyl acrylate/itaconic acid terpolymer.

7. The dispersion of claim 5 wherein Z of the polymeric material is a methyl methacrylate/itaconic acid copolymer.

8. The dispersion of claim 2 wherein the polymeric material in (C) is represented by the structure $$Z \longrightarrow \underset{HOCH_2CH_2}{\overset{HOCH_2CH_2}{N}}{-}(CH_2)_3{-}Si{-}(OCH_2CH_3)_3$$

9. The dispersion of claim 8 wherein Z of the polymeric material is a methyl methacrylate/butyl acrylate/itaconic acid terpolymer.

10. The dispersion of claim 8 wherein Z of the polymeric material is a methyl methacrylate/itaconic acid copolymer.

11. The dispersion of claim 2 wherein the polymeric material in (C) is represented by the structure $$Z \longrightarrow NH_2CH_2CH_2{-}\overset{H}{N}{-}(CH_2)_3{-}Si{-}(OCH_3)_3$$

12. The dispersion of claim 11 wherein Z of the polymeric material is a methyl methacrylate/butyl acrylate itaconic acid terpolymer.

13. The dispersion of claim 11 wherein Z of the polymeric material is a methyl methacrylate/itaconic acid copolymer.

14. The dispersion of claim 2 wherein the polymeric material in (C) is represented by the structure $Z \rightarrow NH_2(CH_2)_3{-}Si{-}(OCH_2CH_3)_3$

15. The dispersion of claim 14 wherein Z of the polymeric material is a methyl methacrylate/butyl acrylate/itaconic acid terpolymer.

16. The dispersion of claim 14 wherein Z of the polymeric material is a methyl methacrylate/itaconic acid copolymer.

17. The dispersion of claim 2 wherein the polymeric material in (C) is represented by the structure $$Z \longrightarrow NH_2(CH_2)_2NH(CH_2)_2{-}\overset{H}{N}{-}\left(CH_2\right)_3{-}Si{-}\left(OCH_3\right)_3$$

18. The dispersion of claim 17 wherein Z of the polymeric material is a methyl methacrylate/butyl acrylate/itaconic acid terpolymer.

19. The dispersion of claim 17 wherein Z is a methyl methacrylate/itaconic acid copolymer.

20. The dispersion of claim 2 wherein the polymer particles in (B) are of polyvinyl fluoride.

21. The dispersion of claim 3 wherein the polymer particles in (B) are of polyvinyl fluoride.

22. The dispersion of claim 4 wherein the polymer particles in (B) are of polyvinyl fluoride.

23. The dispersion of claim 5 wherein the polymer particles in (B) are of polyvinyl fluoride.

24. The dispersion of claim 6 wherein the polymer particles in (B) are of polyvinyl fluoride.

25. The dispersion of claim 7 wherein the polymer particles in (B) are of polyvinyl fluoride.

26. The dispersion of claim 8 wherein the polymer particles in (B) are polyvinyl fluoride.

27. The dispersion of claim 9 wherein the polymer particles in (B) are of polyvinyl fluoride.

28. The dispersion of claim 10 wherein the polymer particles in (B) are of polyvinyl fluoride.

29. The dispersion of claim 11 wherein the polymer particles in (B) are of polyvinyl fluoride.

30. The dispersion of claim 12 wherein the polymer particles in (B) are of polyvinyl fluoride.

31. The dispersion of claim 13 wherein the polymer particles in (B) are of polyvinyl fluoride.

32. The dispersion of claim 14 wherein the polymer particles in (B) are of polyvinyl fluoride.

33. The dispersion of claim 15 wherein the polymer particles in (B) are of polyvinyl fluoride.

34. The dispersion of claim 16 wherein the polymer particles in (B) are of polyvinyl fluoride.

35. The dispersion of claim 17 wherein the polymer particles in (B) are of polyvinyl fluoride.

36. The dispersion of claim 18 wherein the polymer particles in (B) are of polyvinyl fluoride.

37. The dispersion of claim 19 wherein the polymer particles in (B) are of polyvinyl fluoride.

* * * * *